(12) United States Patent
Castro et al.

(10) Patent No.: US 8,535,462 B2
(45) Date of Patent: Sep. 17, 2013

(54) METHOD FOR PRODUCING SPRING RAILS FOR WINDSHIELD WIPERS

(75) Inventors: Victor Castro, Fröndenberg-Frömern (DE); Oskar Pacher, Graz (AT)

(73) Assignee: Stahlwerk Ergste Westig GmbH, Schwerte (DE)

( * ) Notice: Subject to any disclaimer, the term of this patent is extended or adjusted under 35 U.S.C. 154(b) by 209 days.

(21) Appl. No.: 12/919,826

(22) PCT Filed: Feb. 18, 2009

(86) PCT No.: PCT/EP2009/001117
§ 371 (c)(1),
(2), (4) Date: Aug. 27, 2010

(87) PCT Pub. No.: WO2009/106250
PCT Pub. Date: Sep. 3, 2009

(65) Prior Publication Data
US 2011/0036478 A1    Feb. 17, 2011

(30) Foreign Application Priority Data

Feb. 29, 2008 (DE) .................. 10 2008 012 083
Mar. 19, 2008 (DE) .................. 10 2008 014 938

(51) Int. Cl.
*B32B 37/00* (2006.01)
(52) U.S. Cl.
USPC .... 156/73.1; 156/73.5; 156/275.5; 156/308.4

(58) Field of Classification Search
USPC ............. 156/73.1, 73.5, 308.2, 308.4, 580, 156/580.1, 580.2, 272.2, 275.5
See application file for complete search history.

(56) References Cited

U.S. PATENT DOCUMENTS

| | | | |
|---|---|---|---|
| 6,025,438 A | 2/2000 | Hinterwaldner et al. | |
| 2005/0139298 A1* | 6/2005 | Pacher et al. | 148/580 |
| 2005/0256289 A1 | 11/2005 | Kitayama et al. | |
| 2010/0132846 A1 | 6/2010 | Pacher et al. | |

FOREIGN PATENT DOCUMENTS

| | | |
|---|---|---|
| CN | 1743164 A | 9/2012 |
| DE | 1 529 784 | 3/1972 |
| DE | 2 153 809 | 5/1972 |
| DE | 44 08 865 A1 | 9/1995 |
| DE | 103 33 082 A1 | 2/2005 |
| DE | 102006038624 | 3/2008 |
| GB | 1143220 | 2/1969 |
| GB | 1 363 627 | 8/1974 |
| GB | 1 363 627 A | 8/1974 |
| WO | WO 01/58731 | 8/2001 |
| WO | WO 01/58732 | 8/2001 |

* cited by examiner

*Primary Examiner* — James Sells
(74) *Attorney, Agent, or Firm* — Henry M. Feiereisen LLC (57) ABSTRACT

The invention relates to a method for producing coated spring-loaded steel rails especially for windshield wipers comprising a rubber or elastomer wiper blade, wherein a cold-rolled steel rail blank is provided with a zinc layer, whereafter a zinc-containing anchor layer is produced, and a coating made of a polymerizable coating powder is deposited on the anchor layer and partially cured.

20 Claims, 7 Drawing Sheets

METHOD FOR PRODUCING SPRING RAILS FOR WINDSHIELD WIPERS

CROSS-REFERENCES TO RELATED APPLICATIONS

This application is the U.S. National Stage of International Application No. PCT/EP2009/001117, filed Feb. 18, 2009, which designated the United States and has been published as International Publication No. WO 2009/106250and which claims the priority of German Patent Applications, Ser. No. 10 2008 012 083.9, filed Feb. 29, 2008, and Ser. 10 2008 014 938.1, filed Mar. 19, 2008, pursuant to 35 U.S.C. 119(a)-(d)

BACKGROUND OF THE INVENTION

The invention relates to a method for producing spring rails made of steel, in particular for windshield wipers having a rubber or elastomer wiper blade.

Conventional windshield wipers for automobiles include a wiper arm which is supported on a wiper shaft and are driven by a wiper motor. A spring rail with a wiper blade made of rubber is arranged at the end on the wiper arm and frequently attached in an articulated manner. The wiper blade has a wiper edge used to remove water and/or dirt adhering to the windshield.

For a satisfactory function of the wiper blade, the wiper edge should move during operation across the generally curved windshield with constant pressure. The curvature of the spring rail and therefore also the curvature of the wiper edge should adjust themselves under operating conditions so as to contact the windshield to be cleaned across its entire length, in particular, however, at the ends, with sufficient pressure.

In particular at high vehicle speeds, wind turbulences frequently reduce a constant pressing force across the entire wiper length, in particular where the windshield has greater curvature.

In order to maintain the pressure of the wiper blade even at high vehicle speeds and/or wind speeds, the wiper blade must be pressed against the windshield by the spring rail. For example, it is known to insert one or two spring rails into lateral grooves or centrally into the wiper blades.

Due to the spring-elasticity of the spring rail, oscillations may occur, in particular characteristic or resonance oscillations, which may cause the wiper edge to partially lift off, thereby significantly reducing the visibility through the vehicle windshield.

To improve the oscillation characteristic of wiper blades, the published PCT application WO 01/58731 A1 proposes to employ two spring rails which have different resonance frequencies from each other as a result of their different width or thickness or also as a result of their material composition. This is supposed to result in a quieter wiper operation. Disadvantageously, however, the oscillation characteristic is only reduced for a few fixed frequencies, so that the changing operating and oscillation behavior in practical applications cannot be satisfactorily eliminated. In addition, using the different spring rails requires complex assembly and also increases inventory costs.

The elastic oscillations which are undesirable in windshield wipers are generally caused by the low damping of the spring steels used for the spring rails. The reason is that only very few processes that dissipate energy take place in the steel. This is disadvantageous and unfavorable with windshield wipers, because it can cause rattling. Rattling may severely interfere with the operation, reduce the service life of the wiper rail and also present a safety risk.

Investigations have shown that the oscillation characteristic of spring rails in windshield wipers can be dampened by the rubber of the wiper blade. However, this is satisfactory only if a very tight positive contact or a connection exists between the rubber of the wiper blade and spring rail—at least locally at certain locations. Inserting the spring rail into recesses or guide channels of the wiper blade, however, does generally not produce sufficient damping of oscillations, because the spring rail—even when embedded—still has degrees of freedom for oscillations. In practice, this can cause relative movement between the spring rail and the wiper blade, thereby preventing uniform wiping at high vehicle speeds or during wind turbulences. This results in undesirable and detrimental rattle oscillations which have a negative effect in particular at high vehicle speeds.

The invention intends to eliminate these disadvantages and proposes to use a multilayer-coated spring element as a spring rail for windshield wipers. In addition, it should be possible to process the spring rail together with the wiper blade non-positively into a composite part in a simple and cost-effective manner, without requiring punched openings for affixing the spring rail.

It is therefore also an object of the invention to construct the surface of the spring rail so as to enable a non-positive connection to the wiper blade.

SUMMARY OF THE INVENTION

The solution is provided with a method of the aforedescribed type, wherein a cold-rolled spring rail blank made of preferably cold rolled steel is provided with a zinc layer, thereafter preferably in situ a zinc-containing anchor layer is produced, and a cover layer made of a radiation-hardenable and/or polymerizable coating powder or a UV-hardenable varnish or a plastic material based on epoxy resin is applied. The cover layer may be made of polyester which can be welded to acrylic ester, polyamide, polybutyleneterephtalate, polycarbonate, acrylic butadiene styrene, polyethyleneterephtalate, polypropylene, polystyrene, polysulfone, or polyester carbonate and rubber, and the wiper blade. Substances which are partially soluble in $CHCl_3$ (dichloromethane or chloroform) may also be used for the cover layer. The zinc layer may contain up to 15% nickel, iron and cobalt, separately or in combination.

The invention therefore proposes a connection with three layers between, on one hand, the spring rail and, on the other hand, the wiper blade, namely a zinc layer as a base layer, a zinc-containing anchor layer, and a cover layer which is partially soluble in $CHCl_3$.

The anchor layer made of zinc compounds can be produced by an immersion or spray treatment of the spring rail with its zinc layer. For example, the coated spring rail can be moved through a bath with a solution of the anchor molecules or can be sprayed with such a solution. In this way, a stable layer of zinc compounds as an anchor layer is formed in a chemical reaction between the zinc layer and the applied anchor molecules, wherein only the residues of the solution need to be removed from the anchor layer. The anchor layer produced by the chemical reactions of the zinc with the solution remains intact. Suitable anchor molecules are zinc compounds of the elements iron, nickel, chromium, vanadium, titanium, zirconium, molybdenum, and silicon.

The invention is based on the surprising observation that coating powder layers can be welded or joined to elastomers and/or thermoplastic materials, for example by using ultrasound, although a hardened/cured coating powder is a highly cross-linked three-dimensional system of carbon chains and exists quasi as a "giant molecule." This "giant molecule" is practically unable to react or chemically bond, so that such varnish layers are very stable under ambient conditions. Such varnish can also no longer be locally melted to form a liquid phase, which is an important prerequisite for welding, for example ultrasound welding.

It is known that ultrasound welding produces frictional heating through vibrations in the contact zone to a second material, reaching 200° C. and above. This temperature generally causes melting of less cross-linked, predominantly linear-chain molecules, forming a thin melt liquid which enables a joint with another polymer material. This is the longer possible with a hardened coating powder layer, because the "giant molecules" are completely cross-linked and do not melt.

Surprisingly, it has been observed that vibration welding, in particular ultrasound welding, of coating powder layers is possible if the varnish layer has only partially hardened. In the event of incomplete hardening, mostly linear-chain molecules are left behind in the "giant molecule", which are partially crystalline thermoplastic phases and able to melt and react under the influence of ultrasound.

It is hereby important that a required fraction of thermoplastic or low-molecular remaining components in the partially hardened cover layer can be adjusted. The invention shows as proof an approach in form of the solubility or swellability in chloroform ($CHCl_3$). The correct adjustment is possible by a photometric determination of the soluble fractions. Another possibility is to determine the swellability in chloroform, wherein the osmotic penetration of the solvent into the hardened cover layer requires a minimum degree of swelling, as expressed by the swelling measure Q according to the invention.

The bare spring rail is hence coated with three layers, wherein the cover layer is constructed so as to be weldable to the wiper blade by mechanical oscillations. One suitable process is vibration welding at low oscillation frequencies or ultrasound welding. The process is characterized by its short reaction duration, which produces joints fast and at low cost. However, this is only possible if the spring rail is coated according to the invention. A positive joint with a spring rail is possible by using plastic materials which surround or penetrate the wiper blade. However, vulcanizing is less suitable—for cost reasons.

The spring rail is preferably made of spring-elastic steel with
   0.40 to 0.80% carbon,
   0.15 to 1.80% silicon,
   0.40 to 1.80% manganese,
   0.01 to 2% chromium,
   0.001 to 2% vanadium,
   remainder iron, including melt-related contaminants.

The spring rail is preferably used in a quenched and tempered, or patented and cold-redrawn state with a tensile strength of 1400 to 2100 $N/mm^2$. Quenching and tempering can include annealing at 850° C. for 10 to 30 seconds with subsequent cooldown, followed by tempering at 350 to 450° C.

An ultrasound welding apparatus consists of a small press which produces the pressing force between the materials to be welded together and has the Sonitrode transmitting the oscillation. Additional components are the acoustic head for producing the oscillations and a transformation element which transmits with the Sonitrode the oscillations to the components to be welded together.

Typical oscillation frequencies for ultrasound welding are in a range of 20 to 60 kHz, for vibration welding at 200 to 400 Hz. During ultrasound welding, a surface layer of the spring rail is temporarily heated by friction or oscillatory motion in the boundary zone to the wiper blade. This produces a melt joint, because individual components of the varnish melt. This joint, however, is durable only if there is adequate adhesion of the surface layer as well as the adhesion of the layers underneath to each other and to the steel of the spring rail. Otherwise, effects from the oscillation energy may cause the layers to detach. It has been observed that a multilayer coating including a layer with anchor molecules is required for preventing layer detachment and for producing a usable joint. Preferably, the layers have a total thickness of less than 200 μm and the cover layer contains a fraction which is soluble and/or swellable in $CHCl_3$, wherein the boundaries of the cover layer can be determined by measuring the extinction E or the swelling measure Q. Under these conditions, the cover layer can be welded to other plastic or thermoplastic materials so that the wiper blade is joined to the spring rail positively and non-positively.

Extensive tests have shown that the windshield wiper must have a spring rail according to the invention with a base layer of zinc and two additional layers, an anchor layer and a cover layer. These layers are matched to one another so as to provide the best possible corrosion protection for the spring rail, while simultaneously being resistant against effects caused by mechanical oscillations.

BRIEF DESCRIPTION OF THE DRAWING

The invention will now be described in more detail with reference to exemplary embodiments and the drawings. The drawings show in.

DETAILED DESCRIPTION OF PREFERRED EMBODIMENTS

Figure 3:
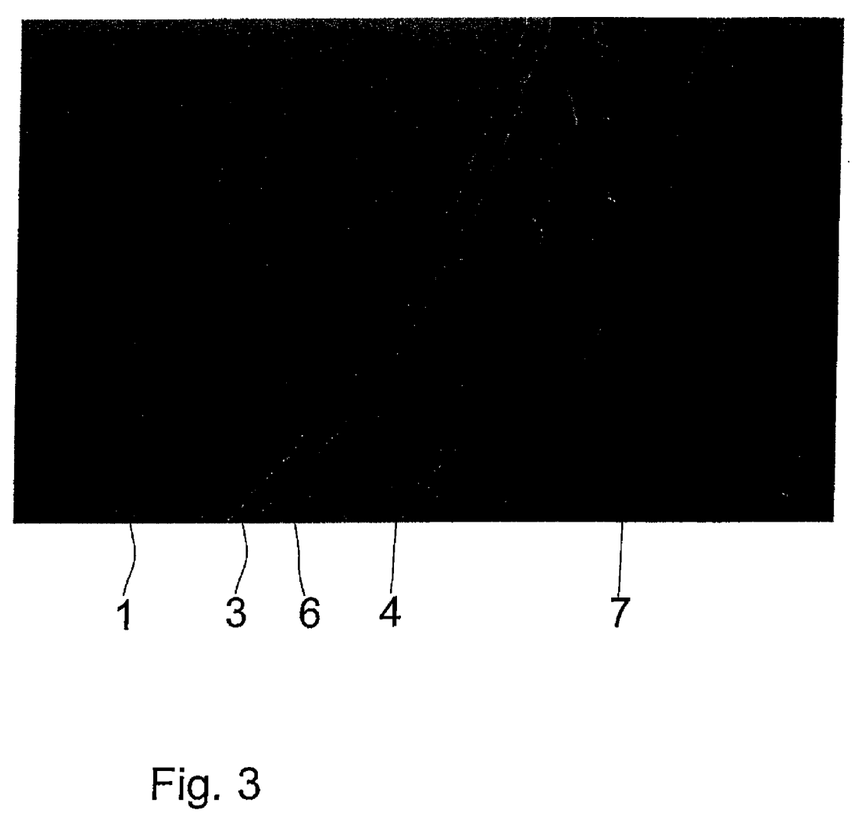
Figure 4:
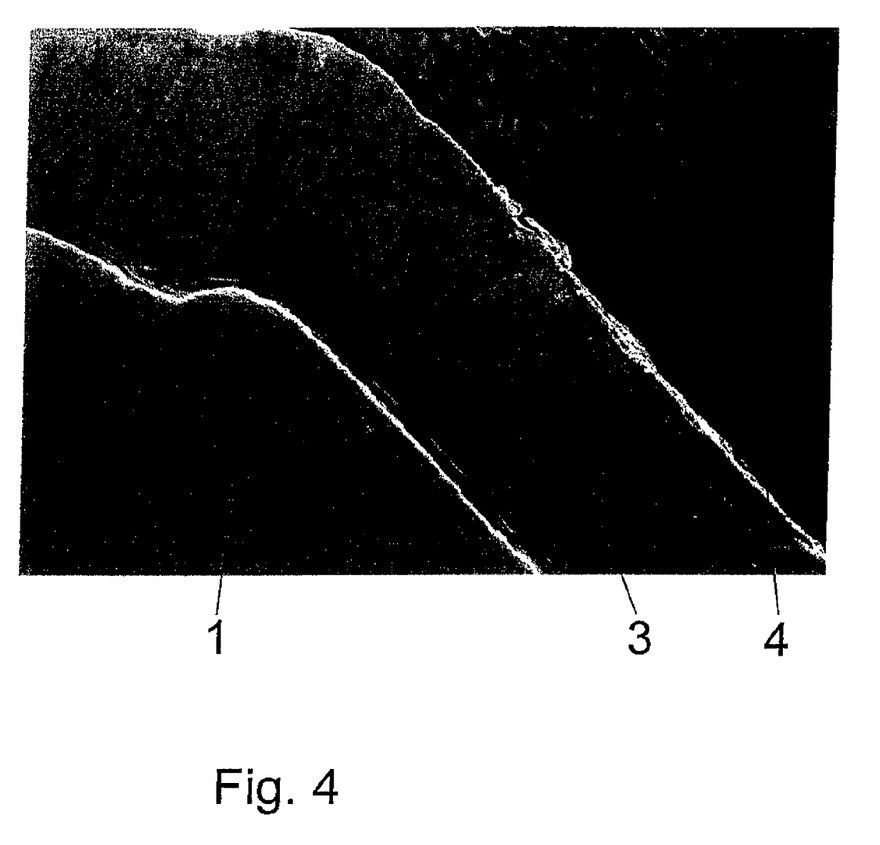
Figure 5:
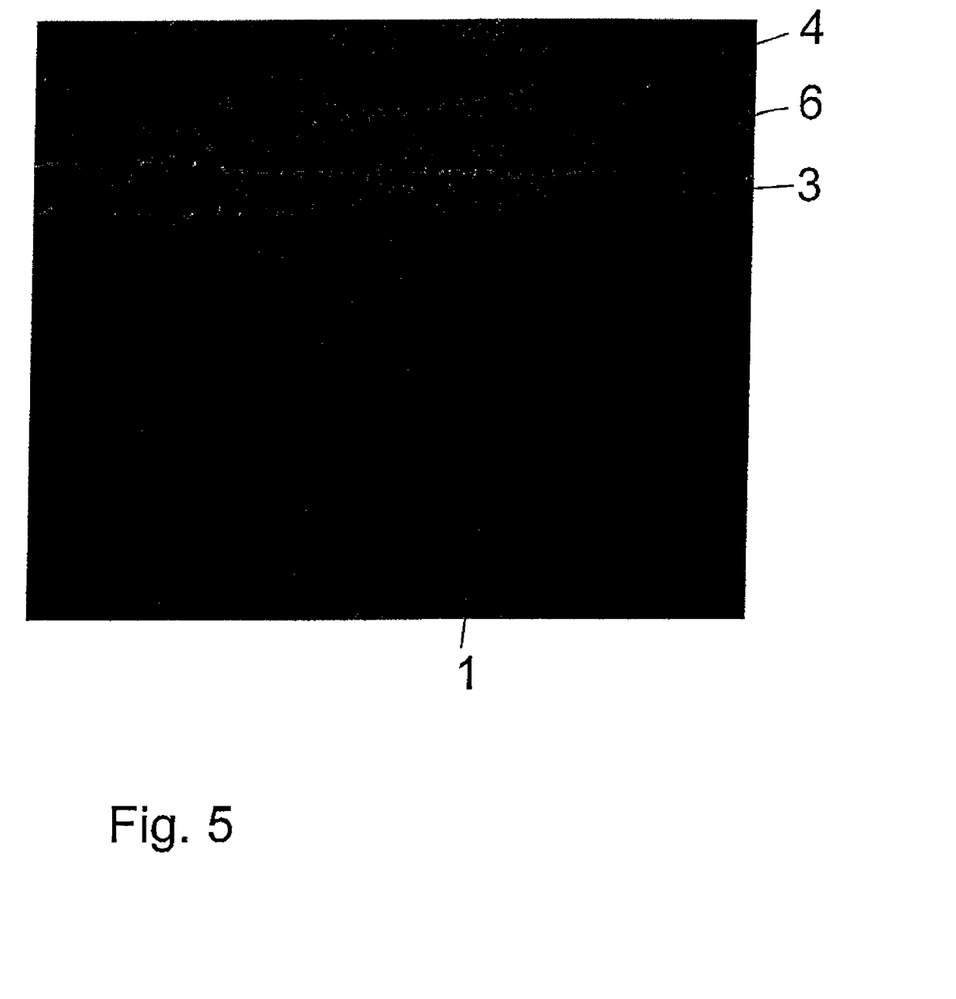

The spring rail 1 according to the invention is made of steel and is provided with a conventional wiper blade 2. The spring rail 1 has a total of three layers, a base layer 3 made of zinc, a cover layer 4 with partially crystalline components 5 that are soluble in $CHCl_3$, and an intermediate reaction or anchor layer 6 made of anchor molecules in a typical embedding material 7 (FIG. 3), which is used merely for embedding the sample.

The base layer 3 is composed of zinc or a zinc alloy with up to 15% nickel, iron and cobalt, separately or in combination. The base layer 3 is applied galvanically in an electrolytic bath directly onto the surface of the metallic spring rail 1. The base layer 3 has a thickness d1 from 2 to 20 μm, preferably from 3 to 10 μm.

The zinc contains in the anchor layer 6, i.e., into transition region to the cover layer 4, oxygen-rich anchor compounds intended to bond or anchor the layers 3 and 4 with each other via molecular forces.

Zinc compounds of the elements iron, nickel, chromium, vanadium, titanium, zirconium, molybdenum, and silicon, preferably with an oxidation number of at least 3, are used as anchor molecules, separately or in combination. Among these compounds are, for example, chromates, vanadates, titanates, zirconates and molybdates as well as the associated acids, which are particularly effective at a pH value of about 1 to 3. The anchor molecules form stable compounds with the zinc atoms in a surface zone of the zinc layer 3 and cover the surface of the zinc layer with a very thin reaction layer 6 which includes, for example, zinc chromate or zinc molybdate. If this reaction layer 6 is missing or if these anchor molecules are missing, then the overall result is poor (Experiment No. 19, 20). The reaction layer 6 is formed in situ by immersion and/or spraying the zinc-coated spring rail 1, 3 with a solution of the anchor molecules. The surface is then rinsed with water and dried.

As additional layer, a cover or surface layer 4 with a layer thickness d2 from 20 to 200 μm, preferably from 30 to 120 μm, is finally applied.

The cover layer 4 consists of a coating powder hardened by radiation and/or temperature. However, this coating powder is only hardened to a certain degree so that for example a soluble residual fraction 5, which can be extracted with $CHCl_3$, remains in the carbon chain scaffold 8, and/or a swelling measure Q of preferably greater than 1.1 can be ensured. With this material property, the cover layer can be welded to rubber, thermoplastic materials or elastomers by ultrasound. Conversely, if the coating powder were fully hardened, it could no longer be welded to elastomers or thermoplastic materials. According to the invention, the coating powder is therefore only partially hardened.

An upper limit and a lower limit exist, in addition to the swelling measure, for the quantity of the soluble residual fraction in the partially-hardened coating powder for attaining optimal coating. The limit values are defined by the extinction $$E = -\log l_0/l = -\log T.$$

$l_0$ is defined as the incident radiation and l as the exiting radiation (after passing through the medium and/or the coating). The extinction E describes as a logarithmic quantity the transmission T at a predetermined wavelength λ. The fraction of the transmitted radiation is referred to as transmission ratio. The attenuation is generally composed of absorption, scattering, diffraction and reflection and is wavelength-dependent. The extinction is the negative base-10 logarithm of the transmission ratio. The extinction E is a measure for the dissolved, i.e., non-hardened varnish fraction. The higher the number of the extinction is, the greater is the soluble fraction.

Characteristic for the quantity of the soluble residual fraction is furthermore the osmotic swelling behavior which is due to the fact that the non-cross-linked components are diluted in a swelling experiment (FIGS. 6, 7) with chloroform ($CHCl_3$) as the solvent, which causes buildup of an internal pressure and consequently swelling, i.e., an increase in the volume.

Figure 6:
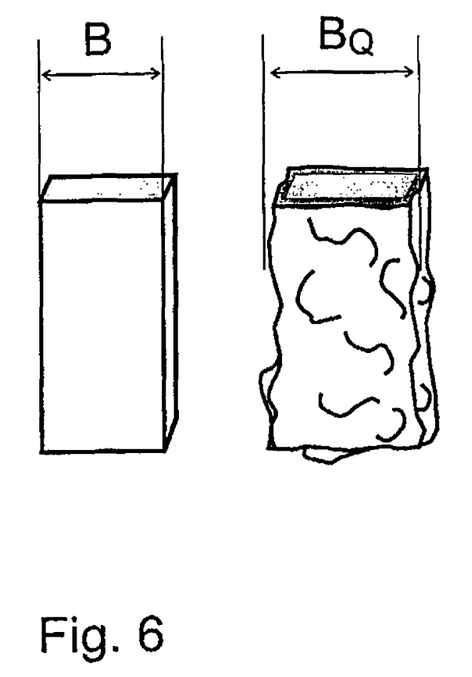
Figure 7:
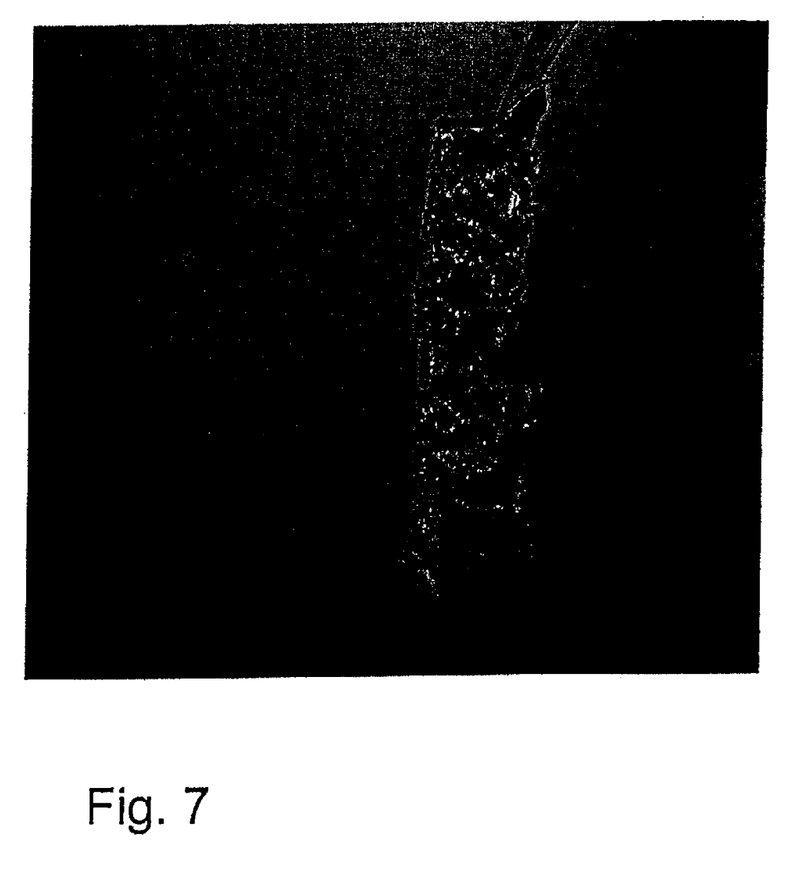

The degree of this increase in volume is expressed as the swelling measure $$Q = B_Q/B,$$

wherein $B_Q$ is the width of a coated spring rail after five-minute swelling in chloroform at room temperature, and B is the initial dimension of the untreated sample, as schematically indicated in FIG. 6.

The swelling measure is preferably greater than 1.1, with an exemplary value 1.5 or even 1.7.

Numerical values are given in the description of the experiment and are reproduced in the following table. The measurements were performed at a wavelength of 340 nm.

Figure 1:
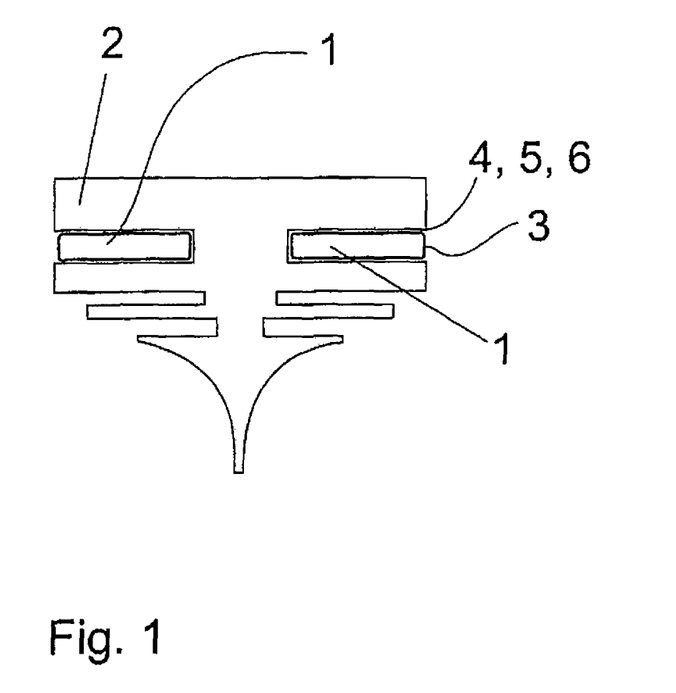
FIG. 1 cross sections through a wiper blade with a spring rail.
Figure 2:
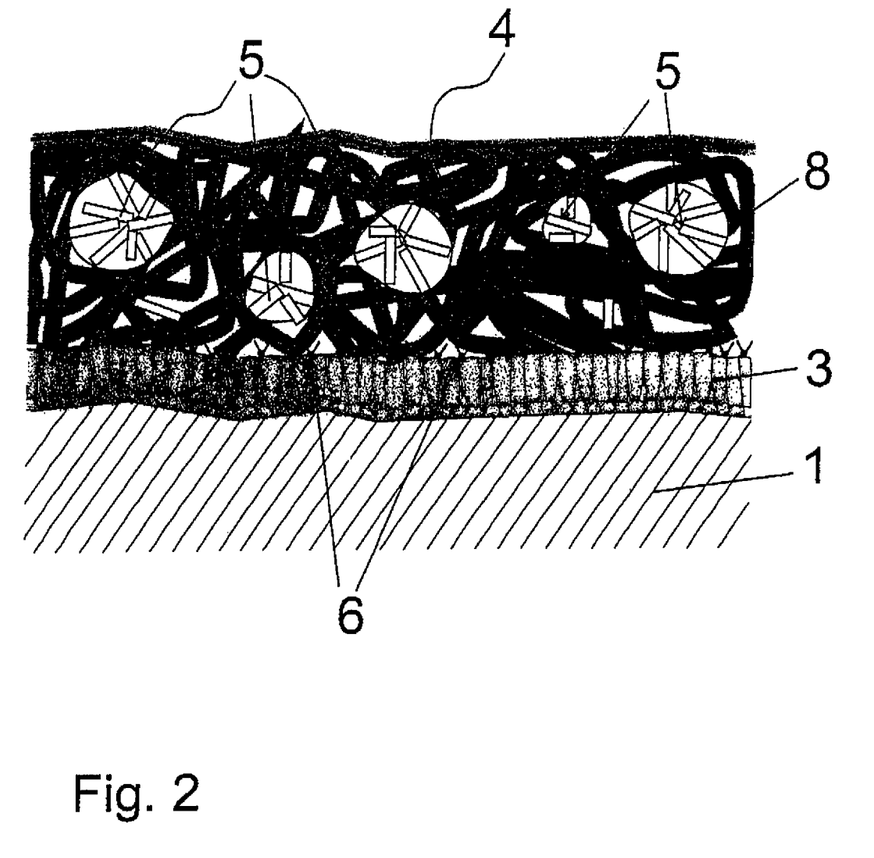
FIG. 2 a schematic diagram of a part of the spring rail with the coating in cross-section, FIG. 3 the micrograph of a part of the spring rail with the coating in cross-section, FIG. 4 an enlarged cross-section of a part of the spring rail with the coating, FIG. 5 an enlarged cross-section of a part of the spring rail with inferior layer adhesion, FIG. 6 an illustration of the swelling measure, and FIG. 7 an image of a sample to illustrate the swelling behavior of a sample treated with $CHCl_3$.

Favorable properties result when the extinction is 1.2 to 2.8. If the extinction and hence the solubility of the residual fraction in the carbon chain skeleton in $CHCl_3$ is greater, then the useful properties are inferior, which may be due to the exceedingly large absorption capacity of the cover layer for water or moisture. In this case, the cross-linking of the carbon chain of the cover layer is less dense, which facilitates incursion of water and moisture and may cause corrosion of the spring rail (Experiments No. 14, 15, 16). Conversely, if the extinction is below the lower limit value of 1.2 (Experiments No. 8, 18, 23, 25), then the cover layer has hardened too much and can no longer be joined with the material of the wiper blade by ultrasound, because the still thermoplastic materials, indicated in FIG. 2 with 5, are absent.

In the experiments, cold-rolled and cleaned steel samples with a width of 7.0 and a thickness in the hardened and tempered or patented state are zinc-coated in a galvanic bath under laboratory conditions with a commercially available Zn-salt under addition of boric acid and NaOH at a bath temperature of 60° C. and a current of 10 A (Experiments No. 1 to 20).

To determine the influence of the layer thickness d1 on the sample properties, the reaction time was varied, resulting in layer thickness is of 2 to 10 μm.

In a second series of experiments, a base layer of zinc/nickel was then applied to the cleaned steel samples in an acidic electrolyte at a pH value of 2.8 (Experiments No. 21 to 23).

A commercially available, radiation-hardenable black coating powder, which was applied with an electrostatic gun onto the surface of the samples, was used for the cover layer 3. Each of the samples 1 to 25 was then hardened with IR radiation in a chamber in a wavelength range from 0.7 to 4 μm for 0.1 to 3 minutes. In another test series, samples were hardened with a mix of IR and UV radiation (Experiments No. 21 to 23).

For evaluating layer adhesion and long-term stability, the samples were subjected to a salt spray test according to DIN 50021, and the surface was rated optically on a quality scale from 1 to 5 after aging for 100 and 200 hours, respectively. Early failures due to layer detachment are indicated in the table with "neg". In addition, aging tests in saturated NaCl-solution were performed in an ultrasound bath, whereafter the samples were evaluated visually. The tests were intended to show if the layer adhesion is adequate under the influence of oscillations. In another test series, the adhesion between the zinc layer and the cover layer was improved with the anchor connections of the anchor layer or reaction layer 4. Anchor connections were introduced into a surface zone of the base layer by immersion of the samples into an aqueous solution containing $K_2CrO_4$, $Na_2VO_4$, $CrO_3$ and $NaMoO_4$ and having in each case a concentration of 0.5 m/l at a pH value of 2.5. The color of the zinc surface changed as a result of the immersion treatment, suggesting the formation of compounds. The samples of this series were then rinsed in water, dried with hot air and coated with a coating powder.

To evaluate if the cover layer or coating powder layer 4 is suitable to be welded to elastomers and thermoplastic materials, the $CHCl_3$-soluble fraction of the hardened coating powder and/or the value of the extinction E, which is proportional to this fraction, and the swelling measure Q were determined. For this purpose, a sample with a varnish surface of 4 $cm^2$ was placed in 10 ml of the solvent $CHCl_3$. After exposure from half an hour to one hour the non-cross-linked thermoplastic components of the varnish layer dissolved accompanied by an increase in volume and entered the solvent. The solvent became discolored, wherein the degree of discoloration is an indication of the completeness or incompleteness of the hardening or polymerization. The degree of discoloration or light absorption was measured with a photometer at a wavelength of 340 nm and a cross-section of the optical cell of 1 $cm^2$ (container cross-section). The measurement results are listed in the Table under "E". It has been observed that an E-value of 1.2 to 2.6 is advantageous to ensure adequate corrosion resistance.

In parallel with the determination of the E-value, the swelling behavior was measured by a measuring B and $B_Q$ after a reaction time of 10 minutes. The measurement results are also listed in the Table. The Q-value of Experiment 8 shows that Q should be greater than 1.1.

Ultrasound welding experiments were performed with a 400 W welding apparatus at 20 kHz. 1 mm thick rubber discs and strips made of PECA (polyester carbonate) were welded to the test samples. The samples were rated visually and microscopically as good (+)/poor (−).

A zinc layer 3 in combination with a cover layer 4 without the anchor layer 6 provides an improved, but still not adequate corrosion resistance, as demonstrated by the Experiments 3 to 5.

Use of a zinc layer with anchor molecules as anchor layer or reaction layer 6 in the Experiments 9 to 13, 17, 21 and 22 yields consistently good to very good results in combination with E-values of about 1.2 to 2.80.

The Experiments 15 and 16 demonstrate that with otherwise adequate thickness, an exceedingly high soluble fraction in the cover layer (E=3.15 and 3.30, respectively) negatively impacts the corrosion resistance, although the weldability is otherwise good. This is due to the fact that these samples have a higher permeability for water in the cover layer.

The Experiment 18 demonstrates that a severely hardened varnish layer (E=0.95) with only a very small $CHCl_3$-soluble fraction has very good corrosion resistance, but cannot be welded. The Experiments 7, 8 and 23 also show poor weldability for a severely hardened cover layer with E-values of 0.51 and 0.79.

The experiments 21 to 23 show no particular advantages obtained by irradiation with mixed light (IR/UV).

The fabrication of the spring rail according to the invention should overall include the following process steps:

1. Cleaning the spring rail, preferably made of profiled steel.
2. Electrolytic deposition of a base layer made of zinc.

TABLE

| | Base layer | | | Cover layer | | | | Corrosion resistance | | | Ultrasound welding test | |
| --- | --- | --- | --- | --- | --- | --- | --- | --- | --- | --- | --- | --- |
| | | | | | | | | DIN 50021 | | Rating NaCl + | With | With |
| Exp. No. | Type | Thickness (µm) | Anchor connection | Thickness (µm) | Extinction E | Swelling Q | Hardening | 100 h | 200 h | ultrasound | rubber | thermoplast |
| 1 | Zn | 0 | 0 | 30 | n.d. | n.d. | IR | neg. | n.d. | neg. | n.d. | n.d. |
| 2 | Zn | 0 | 0 | 20 | n.d. | n.d. | IR | 5 | n.d. | neg. | n.d. | n.d. |
| 3 | Zn | 3 | 0 | 40 | n.d. | n.d. | IR | 5 | n.d. | 5 | n.d. | n.d. |
| 4 | Zn | 5 | 0 | 14 | n.d. | n.d. | IR | 4 | 5 | 5 | n.d. | n.d. |
| 5 | Zn | 5 | 0 | 40 | n.d. | n.d. | IR | 5 | n.d. | 5 | n.d. | n.d. |
| 6 | Zn | 12 | 0 | 20 | n.d. | n.d. | IR | 2 | 4 | 4 | − | n.d. |
| 7 | Zn | 12 | 0 | 10 | n.d. | n.d. | IR | 4 | 5 | 5 | − | − |
| 8 | Zn | 5 | Chromate | 20 | 1.02 | <1.1 | IR | 2 | 2 | 2 | − | − |
| 9 | Zn | 5 | Chromate | 20 | 2.30 | 1.1 to 1.2 | IR | 2 | 3 | 2 | + | + |
| 10 | Zn | 12 | Chromate | 55 | 1.25 | 1.4 to 1.6 | IR | 1 | 1 | 1 | + | + |
| 11 | Zn | 12 | Chromate | 50 | 2.22 | 1.4 to 1.5 | IR | 1 | 1 | 1 | + | + |
| 12 | Zn | 12 | Chromate + Vanadate | 80 | 2.45 | 1.5 to 1.6 | IR | 1 | 1 | 1 | + | + |
| 13 | Zn | 12 | Chromate + Vanadate | 85 | 2.75 | 1.5 to 1.6 | IR | 1 | 1 | 1 | + | + |
| 14 | Zn | 13 | Chromate + Vanadate | 80 | 3.15 | neg. | IR | 4 | 5 | 3 | neg. | + |
| 15 | Zn | 12 | Chromate + Vanadate | 80 | 3.30 | neg. | IR | 5 | n.d. | neg. | neg. | neg. |
| 16 | Zn | 20 | Molybdate | 125 | 3.10 | neg. | IR | 2 | 5 | 2 | neg. | + |
| 17 | Zn | 20 | Molybdate | 25 | 2.00 | 1.3 to 1.4 | IR | 1 . . . 2 | 2 | 2 | + | + |
| 18 | Zn | 20 | Molybdate | 45 | 0.95 | 1 to 1.1 | IR | 1 | 1 | 1 | − | − |
| 19 | Zn | 15 | 0 | 50 | 1.95 | 1.2 to 1.3 | IR | 3 | 5 | 2 | − | + |
| 20 | Zn | 15 | 0 | 50 | 2.10 | 1.3 to 1.5 | IR | 3 | 5 | 2 | neg. | neg. |
| 21 | Zn/Ni | 10 | Chromate | 60 | 2.10 | 1.3 to 1.4 | IR + UV | 1 | 1 | 1 | + | + |
| 22 | Zn/Ni | 10 | Molybdate | 60 | 2.25 | 1.4 to 1.5 | IR + UV | 1 | 1 | 1 | + | + |
| 23 | Zn/Ni | 10 | Molybdate | 55 | 0.85 | 1.10 | IR + UV | 1 | 1 | 1 | − | − |
| 24 | Zn | 12 | Chromate | 50 | n.d. | 1.5 to 1.7 | IR | 1 | 1 | 1 | + | + |
| 25 | Zn | 14 | Chromate | 40 | n.d. | 1.4 to 1.5 | IR | 1 | 1 | 1 | + | + |

Corrosion Rating: 1 Very good 5 Poor
n.d.: Not determined
neg.: Layer detachment The Experiments 1 and 2 demonstrate that a cover layer with a thickness of 20 or 30 µm on steel alone does not provide adequate corrosion protection. Accordingly, no further characteristic values were determined under these conditions.

3. Forming a reaction layer in a region near the surface of the base layer with anchor molecules. Suitable anchor molecules are compounds of the elements chromium, iron, nickel, vanadium, titanium, zirconium, molybdenum, and silicon, separately or in combination, with an oxidation number of at least 3. These are preferably solutions of chromates, vanadates, titanates, zirconates, and molybdates, as well as the corresponding acids.

4. Removing excess or adhering solvent residues by rinsing with water and drying the surface.

5. Coating the surface with an IR- and/or UV-hardening coating powder with a layer thickness from 20 to 200 µm, preferably from 30 to 120 µm (cover layer).

6. Hardening the cover layer by adjusting the duration and intensity of the irradiation, which should preferably be selected so that the $CHCl_3$-soluble fraction results in extinction in a range from 1.2 to 2.6 at a wavelength of 340 nm, or that the swelling measure Q is greater than 1.1.

7. Joining the coated spring rail to a wiper blade.

What is claimed is:

1. A method for producing a coated spring rail made of steel for a windshield wiper having a rubber or elastomer wiper blade, comprising the steps of:
   applying on a steel blank a zinc layer base forming a base layer,
   producing a zinc-containing anchor layer by a reaction of zinc with oxygen-rich metal compounds having an oxidation number of at least 3,
   applying a cover layer of a polymerizable coating powder to the anchor layer, and
   partially hardening the cover layer.

2. The method of claim 1, wherein the cover layer is made of a polyester, which is weldable with at least one of acrylic ester, polyamide, polybutyleneterephtalate, polycarbonate, acrylic butadiene styrene, polyetheneterephtalate, polypropylene, polystyrene, polysulfone, or polyester carbonate, and rubber.

3. The method of claim 1, wherein the zinc layer comprises up to 15% of at least one of nickel, iron and cobalt.

4. The method of claim 1, wherein the anchor layer comprises 5 to 20% oxygen compounds of iron, nickel, chromium, vanadium, titanium, zirconium, molybdenum, and cobalt, separately or in combination, having an oxidation number of at least 3.

5. The method of claim 1, wherein the zinc layer has a thickness of 2 to 20 µm.

6. The method of claim 1, wherein the zinc layer has a thickness of 3 to 8 µm.

7. The method of claim 1, wherein the zinc layer is electrolytically deposited in an acidic bath.

8. The method of claim 1, wherein the cover layer 20 to 200 µm.

9. The method of claim 1, wherein the anchor layer has a thickness of 0.01 to 0.3 µm.

10. The method of claim 1, wherein the anchor layer is produced by immersion, rolling or spraying.

11. The method of claim 1, wherein the steel of the spring rail comprises
   0.40 to 0.80% carbon,
   0.15 to 1.80% silicon,
   0.40 to 1.80% manganese,
   0.01 to 2% chromium,
   0.001 to 2% vanadium,
   remainder iron, including melt-related contaminants.

12. The method of claim 1, further comprising the step of annealing the steel blank for 3 to 30 sec at 200 to 400° C., before the zinc layer is applied.

13. The method of claim 1, further comprising the step of introducing into the cover layer at least one of particles, pigments and micro-bubbles.

14. The method of claim 1, further comprising the step of positively joining the coated spring rail to a wiper blade by ultrasound or vibration spot-welding.

15. The method of claim 1, wherein the wiper blade is made of rubber and the coated spring rail is welded to the wiper blade by ultrasound welding at a frequency of 20 to 60 kHz.

16. The method of claim 1, wherein the wiper blade is made of rubber and the coated spring rail is welded to the wiper blade by vibration welding at a frequency of 200 to 800 Hz.

17. A method for producing a windshield wiper having a rubber or elastomer wiper blade, comprising the steps of:
   applying on a steel blank a zinc layer base forming a base layer,
   producing a zinc-containing anchor layer by a reaction of zinc with oxygen-rich metal compounds having an oxidation number of at least 3,
   applying a cover layer of a polymerizable coating powder to the anchor layer,
   partially hardening the cover layer to produce a coated spring rail, and
   positively joining the coated spring rail to the wiper blade by ultrasound or vibration spot-welding.

18. A method for producing a windshield wiper having a wiper blade made of rubber or elastomer and a coated spring rail made of steel, comprising the steps of:
   applying on a steel blank a zinc layer base forming a base layer,
   producing a zinc-containing anchor layer by a reaction of zinc with oxygen-rich metal compounds having an oxidation number of at least 3,
   applying a cover layer of a polymerizable coating powder to the anchor layer,
   partially hardening the cover layer by applying IR or UV radiation, or both,
   adjusting a required fraction of thermoplastic or low-molecular remaining components in the partially hardened cover layer, and
   positively joining the partially hardened cover layer of the coated spring rail to the wiper blade by ultrasound or vibration spot-welding.

19. The method of claim 18, wherein before adjusting, determining the required fraction or the low-molecular remaining components by photometric determination or by determining a minimum degree of swellability in chloroform.

20. The method of claim 19, wherein duration and intensity of the applied IR or UV irradiation are selected so that the chloroform-soluble fraction results in extinction in a range from 1.2 to 2.6 at a wavelength of 340 nm, or that a swelling measure Q is greater than 1.1.

* * * * *